US012778839B2

(12) United States Patent
Newnam et al.

(10) Patent No.: US 12,778,839 B2
(45) Date of Patent: Nov. 3, 2026

(54) MASSAGE ROLLER

(71) Applicant: MerchSource, LLC, Irvine, CA (US)

(72) Inventors: Reid Smith Newnam, Chapel Hill, NC (US); Chris Owens, Austin, TX (US); Kit Morris, Austin, TX (US)

(73) Assignee: MerchSource, LLC, Irvine, CA (US)

(*) Notice: Subject to any disclaimer, the term of this patent is extended or adjusted under 35 U.S.C. 154(b) by 613 days.

(21) Appl. No.: 18/227,810

(22) Filed: Jul. 28, 2023

(65) Prior Publication Data

US 2024/0033167 A1 Feb. 1, 2024

Related U.S. Application Data

(60) Provisional application No. 63/393,168, filed on Jul. 28, 2022.

(51) Int. Cl.
*A61H 15/00* (2006.01)

(52) U.S. Cl.
CPC . *A61H 15/0092* (2013.01); *A61H 2015/0014* (2013.01); *A61H 2201/0107* (2013.01)

(58) Field of Classification Search
CPC ................ A61H 15/00; A61H 15/0092; A61H 2015/0007; A61H 2015/0014; A61H 2015/0042; A61H 2201/1253; A61H 2015/0057
See application file for complete search history.

(56) References Cited

U.S. PATENT DOCUMENTS

| | | | | | |
|---|---|---|---|---|---|
| 1,400,547 | A * | 12/1921 | Holmstrom | A61H 15/0092 | 601/125 |
| 1,908,051 | A * | 5/1933 | Reichl | A61H 15/0092 | 601/119 |
| 1,999,939 | A * | 4/1935 | Luzzi | A61H 15/0092 | D24/211 |
| 2,091,131 | A * | 8/1937 | Cone | A61H 15/0092 | 15/244.1 |
| 2,219,138 | A * | 10/1940 | Morrison | A61H 15/0078 | 601/133 |
| 2,621,652 | A * | 12/1952 | Ehrhardt | A61H 15/0092 | 601/119 |
| 3,583,396 | A * | 6/1971 | Landis | A61H 15/0092 | 601/125 |
| 4,493,315 | A * | 1/1985 | Iwahashi | A61H 7/001 | 601/135 |
| 5,643,182 | A * | 7/1997 | Engel | A61H 15/0092 | 601/123 |
| 5,792,081 | A * | 8/1998 | Cross | A61H 15/0092 | 601/129 |
| 10,143,617 | B2 | 12/2018 | Nelson | | |
| 10,869,807 | B2 | 12/2020 | Nelson | | |
| 10,945,913 | B2 | 3/2021 | Nelson | | |

(Continued)

*Primary Examiner* — Timothy A Stanis
*Assistant Examiner* — Christopher E Miller
(74) *Attorney, Agent, or Firm* — Avyno Law P.C.

(57) ABSTRACT

A massage roller is disclosed that provides a pair of massage roller assemblies each having at least one roller element in opposed spaced relationship to allow a massageable portion of a user's body to be positioned between the roller elements for a rolling massage effect. The pair of massage roller assemblies may also be detached from the massage roller such that each massage roller assembly independently can be utilized for massaging a massageable portion of a user's body.

16 Claims, 12 Drawing Sheets

(56) References Cited

U.S. PATENT DOCUMENTS

| | | | | |
|---|---|---|---|---|
| D915,615 | S * | 4/2021 | Chen | D24/211 |
| D924,416 | S * | 7/2021 | Matsushita | D24/211 |
| 11,446,533 | B1 * | 9/2022 | Xu | A61H 15/0092 |
| 2005/0159688 | A1 * | 7/2005 | Sakamoto | A61H 15/0092 601/123 |
| 2013/0018290 | A1 * | 1/2013 | Holdorf | A61H 15/0092 601/128 |
| 2013/0245509 | A1 * | 9/2013 | Tanigawa | A61H 15/0092 384/368 |
| 2014/0228722 | A1 * | 8/2014 | Nelson | A61H 15/0092 601/125 |
| 2015/0374576 | A1 * | 12/2015 | Dagan | A61H 7/003 601/119 |
| 2016/0296415 | A1 * | 10/2016 | Cross | A61H 15/0092 |
| 2017/0056284 | A1 * | 3/2017 | Kramer | A61H 15/0092 |
| 2018/0116903 | A1 * | 5/2018 | Matsushita | A61H 7/003 |
| 2018/0280229 | A1 * | 10/2018 | Cross | A61H 7/003 |
| 2019/0099323 | A1 * | 4/2019 | Nelson | A61H 15/0092 |
| 2019/0274915 | A1 * | 9/2019 | Cross | A61H 15/0092 |
| 2020/0222271 | A1 * | 7/2020 | Forostenko | A61H 15/0092 |
| 2020/0246214 | A1 * | 8/2020 | Nelson | A61H 15/00 |
| 2020/0368101 | A1 * | 11/2020 | Nash | A61H 15/00 |
| 2020/0390642 | A1 * | 12/2020 | Kim | A61N 1/0456 |
| 2021/0030617 | A1 * | 2/2021 | Penn | A61H 39/04 |
| 2021/0077339 | A1 | 3/2021 | Nelson | |
| 2021/0145689 | A1 * | 5/2021 | Cheong | A61H 15/0085 |
| 2021/0369546 | A1 * | 12/2021 | Meisch | A61F 7/02 |
| 2022/0354732 | A1 * | 11/2022 | Levi | A61N 5/0625 |
| 2022/0409477 | A1 * | 12/2022 | Triggianese | A61H 7/003 |
| 2023/0218475 | A1 * | 7/2023 | Rhyder | A61H 15/02 601/118 |

* cited by examiner

MASSAGE ROLLER

CROSS REFERENCE TO RELATED APPLICATIONS

This application claims priority to U.S. Provisional Application Ser. No. 63/393,168, titled Massage Roller, filed on Jul. 28, 2022, which application is incorporated herein by reference in its entirety.

FIELD OF INVENTION

The invention relates to a massager device, namely a massage roller device having a pair of massage roller assemblies in opposed spaced relationship to one another for allowing the massage roller device to massage a massageable portion of a user's body.

BACKGROUND

Conventional personal massagers are commonly used by user's for massaging a portion(s) of the user's own body. Such conventional personal massagers, particular those that are purely mechanical personal massagers (as opposed to electric personal massagers), require the user to exert a certain amount of force on the personal massager that directly correlates to the amount of pressure the user feels on his or her own body. Accordingly, the user may experience fatigue, thus compromising the effectiveness of the personal massager. Additionally, many conventional personal massagers only allow a user to massage one or two different areas of the user's body.

Therefore, a need exists for a personal massager that limits the amount of force and fatigue a user may experience when massaging him or herself. A need also exists for a personal massager that is versatile for allowing the user to reach all areas of his or her body. The instant invention provides at least these needs.

SUMMARY OF THE INVENTION

The present invention provides a massage roller for massaging a massageable portion of a user's body.

In one example, the massage roller may comprise of a cross member having a first end and a second end. A pair of massage roller assemblies may detachably coupled to the cross member. In particular, a first massage roller assembly may be detachably coupled to the first end of the cross member and a second massage roller assembly may be detachably coupled to the second end of the cross member. Each massage roller assembly may further include a handle and at least one roller element.

In operation, upon forcible urging by the user to increase the distance between the at least one roller element of the first massage roller assembly and the at least one roller element of the second massage roller assembly, a user may position a massageable portion between the at least one roller element of the first massage roller assembly and the at least one roller element of the second massage roller assembly for a rolling massage effect.

In another example, the massage roller may comprise of a cross member having a first end, a flexible middle portion and a second end. A pair of massage roller assemblies may be coupled to the cross member. In particular, a first massage roller assembly may be coupled to the first end of the cross member and a second massage roller assembly may be coupled to the second end of the cross member. Each massage roller assembly may further include a handle and at least one roller element.

In operation, the middle portion of the cross member flexes upon forcible urging to increase the distance between the at least one roller element of the first massage roller assembly and the at least one roller element of the second massage roller assembly. In this example, a user may also position a massageable portion between the at least one roller element of the first massage roller assembly and the at least one roller element of the second massage roller assembly for a rolling massage effect.

In yet another example, each of the massage roller assemblies described above, when detached, may independently operate as a massage roller. Therefore, the present invention further provides a massage roller having a handle having a first end and a second end where the handle can be gripped by a user during operation of the massage roller. The massage roller may further comprise of a support arm extending from the handle. Two separate axle rods may extend from the support arm. In particular, a first axle rod and a second axle rod may extend in opposite directions from the support arm. Further, a first roller element may be rotatably coupled to the first axle rod and a second roller element may be rotatably coupled to the second axle rod.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

DESCRIPTION OF FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF FIGURES

In this disclosure, all "aspects," "examples," "embodiments," and "implementations" described are considered to be non-limiting and non-exclusive. Accordingly, the fact that a specific "aspect," "example," "embodiment," or "implementation" is explicitly described herein does not exclude other "aspects," "examples," "embodiments," and "implementations" from the scope of the present disclosure even if not explicitly described. In this disclosure, the terms "aspect," "example," "embodiment," and "implementation" are used interchangeably, i.e., are considered to have interchangeable meanings.

In this application, the term "substantially," "approximately," or "about," when modifying a specified numerical value, may be taken to encompass a range of values that include +/−10% of such numerical value. Further, terms such as "communicate," and "in communication with," or "interfaces" or "interfaces with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate or interface with a second component is not intended to exclude the possibility that additional components may be present between, and/or operatively associated or engaged with, the first and second components.

Figure 1:
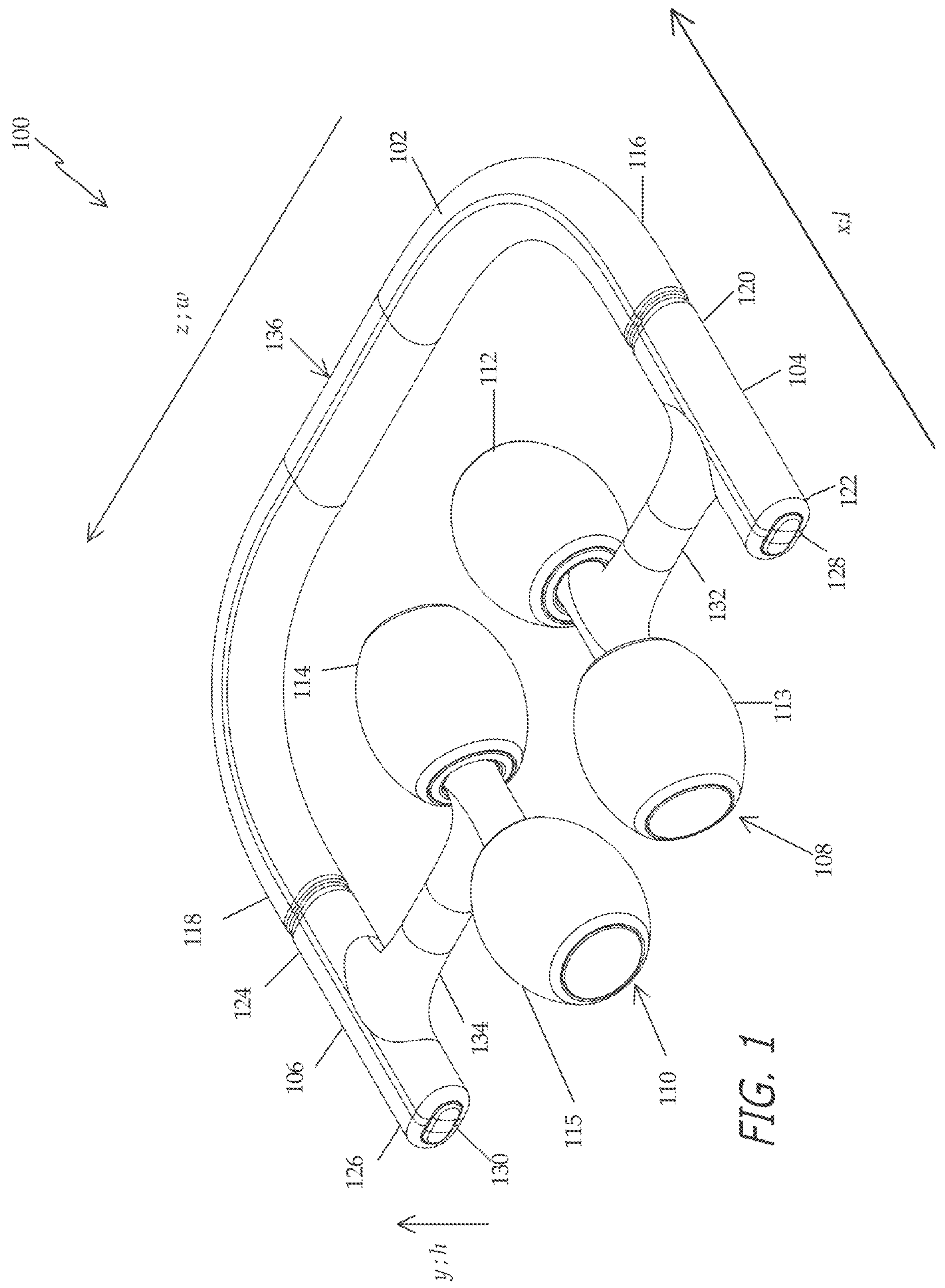
FIG. 1 is a perspective view of one example of the massager roller of the present invention.

For purposes of reference and description, the massage roller 100 of the present invention is considered to have a y-axis (x), y-axis (y) and a z-axis (z), as shown in FIG. 1 along which the components of the massage roller are positioned relative to each other. Terms such as "axial" and "axially" are assumed to refer to the respective axis or any direction or axis parallel to the device axis, unless indicated otherwise or the context dictates otherwise. For convenience, movement relative to a device axis may alternatively encompass movement relative to an axis that is parallel to the device axis that is specifically illustrated in FIG. 1, unless the context dictates otherwise. Thus, linear translation "along the device z-axis" is not limited to translation directly on (coincident with) the device axis, but also encompasses translation parallel to the device z-axis, depending on the context. Similarly, rotation "about the device x-axis" also encompasses rotation about an axis that is parallel to the device axis x, depending on the context.

Further, the massage roller 100 of the present invention is considered to have a height (h), length (l) and width (w), as also shown in FIG. 1. It should further be understood that height (h) may also define a vertical plane while length (l) and width (w) may also define a horizontal plane.

As will be illustrated and discussed in detail below, the present invention relates to a massage roller device having multiple functionalities for promoting blood flow, relieving fatigue, relaxing muscles and speeding recovery. Given the multi-functional features of the present invention, including but not limited to the detachable massage roller assemblies, that can be used for targeting a variety of different muscles and problem areas, the massage roller device of the present invention may also be described as a modular massage roller system.

Further, the massage roller 100 of the present invention can be used as a massage device. When detached, each of the massage roller assemblies 108, 110 disclosed herein can also used as independent massage devices. In this regard, it should be understood that each of the massage roller assemblies 108, 110 may be described also as a "massage roller," or "mini massage roller."

Referring to FIG. 1, FIG. 1 is a perspective view of one example of the massage roller 100 of the present invention. In this example, the inventive massage roller 100 comprises a cross member 102 and a pair of massage roller assemblies 108, 110 that may be detachably coupled to cross member 102. Massage roller assembly 108 may comprise of a handle portion 104, a support arm 132, axle rods 510, 512 and roller elements 112, 113. Massage roller assembly 110 may comprise of a handle portion 106, a support arm 134, axle rods 514, 516 and roller elements 114, 115. Roller element 112 is rotatably attached to axle rod 510, roller element 113 is rotatably attached to axle rod 512, roller element 114 is rotatably attached to axle rod 514 and roller element 115 is rotatably attached to axle rod 516.

In the example shown in FIG. 1, each massage roller assembly 108, 110 includes two roller elements. As to other examples, each massage roller assembly 108, 110 can have one roller element or a plurality of roller elements, such as two, three, four, five, six or more depending upon the application.

The cross member 102 may comprise of a first end 116, a second end 118 and a middle portion 136. Further, the first handle 104 of massage roller assembly 108 may comprise of a first end 120 and a second free end 122. Similarly, the second handle 106 of massage roller assembly 110 may comprise of a first end 124 and a second free end 126. The first end 120 of massage roller assembly 104 may attach to the first end 116 of cross member while the first end 124 of massage roller assembly 110 may attach to the second end 118 of cross member 102. Massage roller assembly 108 may further comprise of a support arm 132 that extends inwardly towards handle 106 from handle 104 from a position between the first end 120 and second free end 122 of handle 104. Similarly, massage roller assembly 110 may comprise of a support arm 134 that extends inwardly towards handle 104 from handle 106 from a position between the first end 124 and second free end 126 of handle 106. Positioning support arms 132, 134 such that they extend from between the first end 120, 124 and second free end 122, 126 allows a user to establish a better grip on handles 104, 106 as it allows a user, among other things, the ability to grab the handle 104, 106 both below and above the support arm 132, 134, thereby allowing the weight or force applied to the support arm 132, 134 to be balanced in a user's hand. As further shown in FIG. 1, the support arms 132, 134 horizontally extend towards one another on the same plane.

As stated above, each of the first and second handles 104, 106 may be detachably coupled to cross member 102. In particular, the first end 120 of first handle 104 may detachably couple to the first end 116 of cross member 102 and the first end 124 of second handle 106 may detachably couple to the first end 118 of cross member 102. While discussed in greater detail below, one example of a detachable coupling mechanism that may be used for detachably coupling the first and second handles 104, 106 of the massage roller assemblies 108, 110 to the cross member 102 may be a detachable mechanism (600) that is actuated by a release button 128, 130 located at the free second ends 122, 126 correspondingly.

Figure 2:
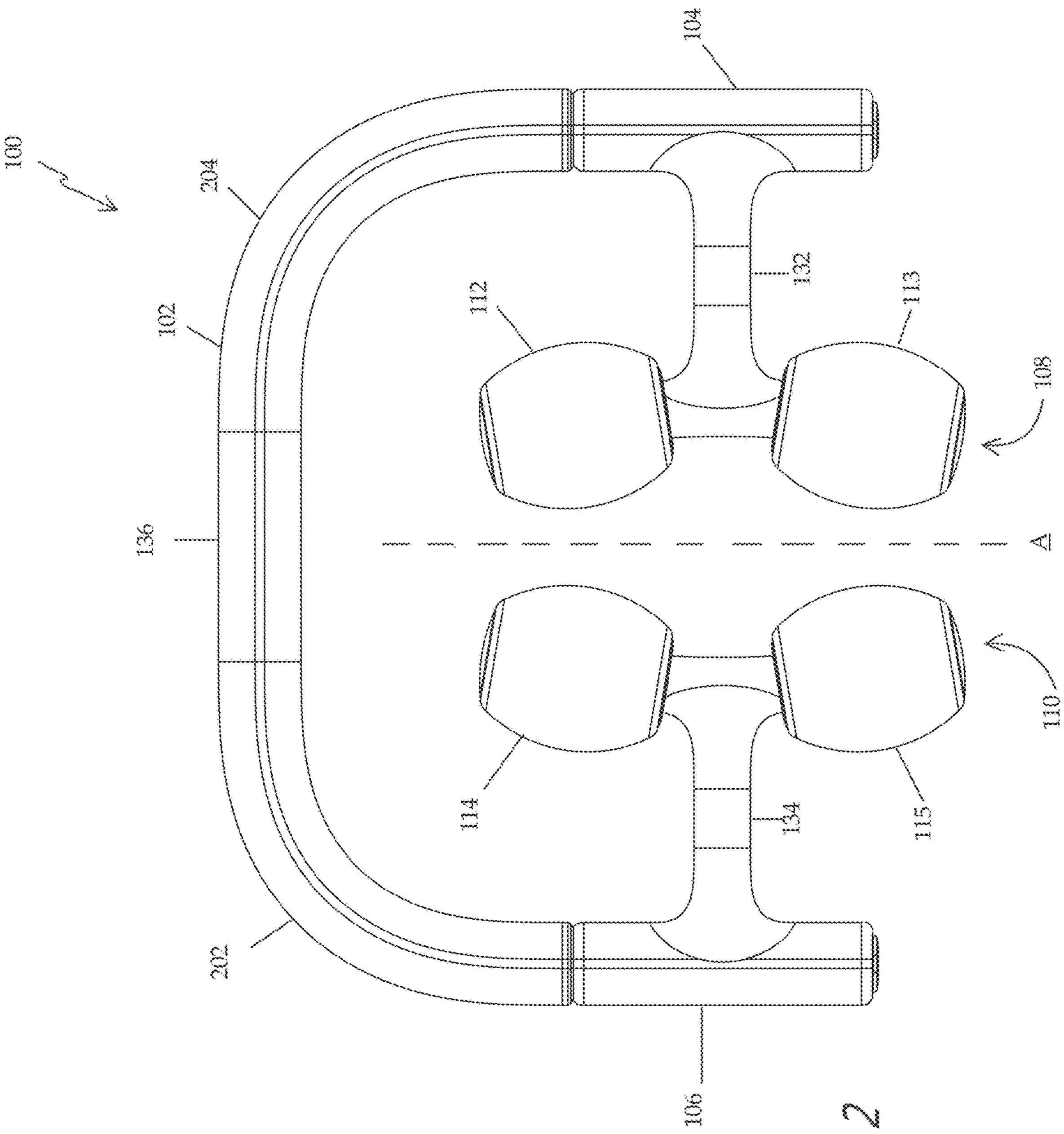
FIG. 2 is a top view of the massager roller of FIG. 1.

FIG. 2 is a top view of the massage roller 100 of FIG. 1. In particular, FIG. 2 shows the massage roller 100 in a closed condition. As shown, the cross member 102 may take on a U shape, where the corners 202, 204 of the cross member 102 are curved. It should be understood that the present invention is not limited to its U-shaped design. For example, in other examples, the cross member 102 may be shaped as a half square where the corners 202, 204 of the cross member create right angles.

FIG. 2 also shows the symmetry of the massage roller 100. In particular, half of massage roller 100 mirrors the other half of the massage roller 100 along vertical plane A positioned directly between roller elements 112, 113 and roller elements 114, 115. Accordingly, support arms 132, 134 may be disposed as opposing mirror images of one another along vertical plane A. Similar to support arms 132, 134, roller elements 112, 115 and 113, 114 may also be disposed as opposing mirror images of one another along vertical plane A. Such mirror image construction allows for roller elements 112, 113, 114, 115 of the massage roller 100 to provide a uniform massage effect on the massageable portion of a user's body.

Figure 3:
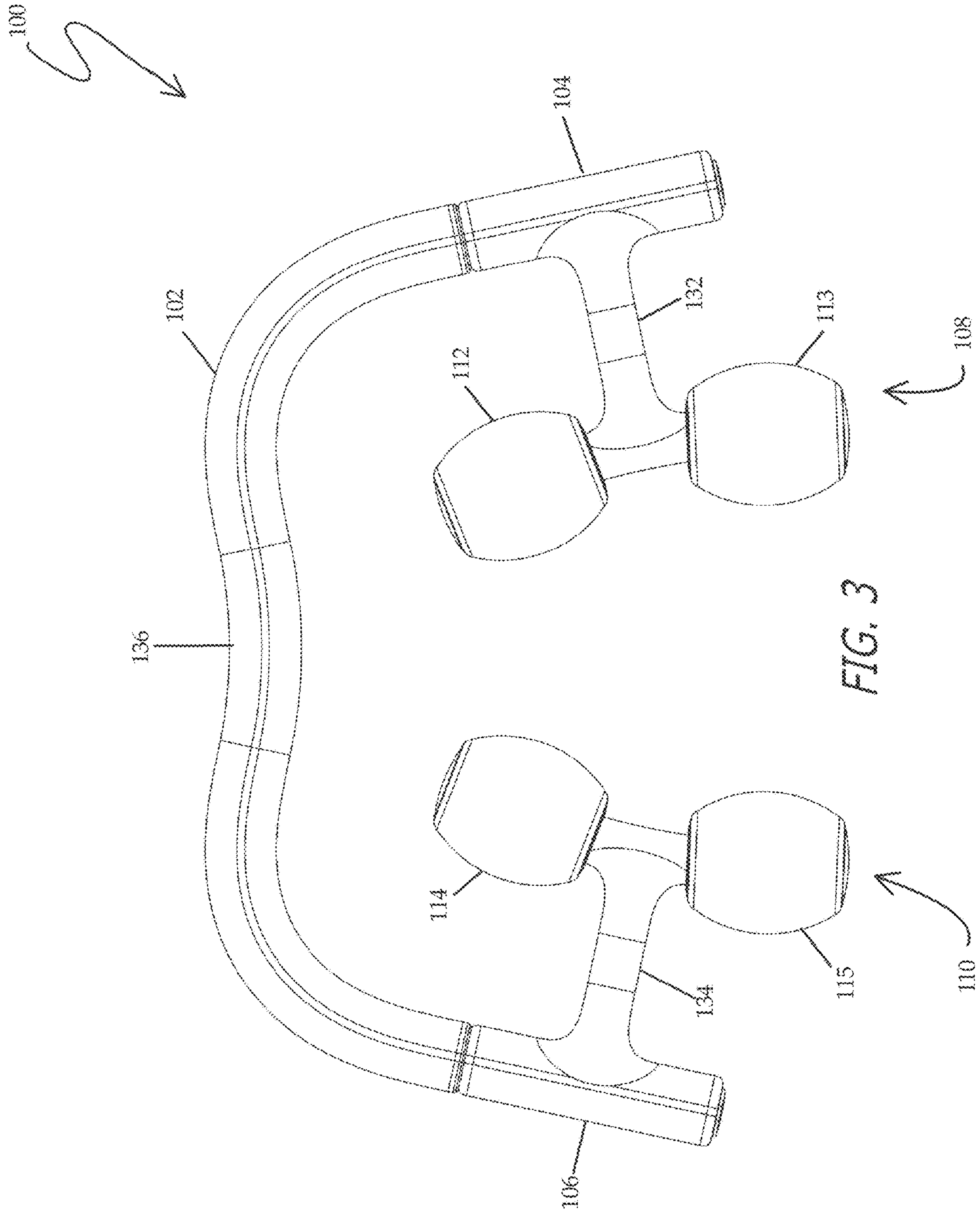
FIG. 3 is a top view of the massage roller of FIG. 1 where the cross member is flexed.

FIG. 3 is a top view of the massage roller of FIG. 1 where the cross member is flexed. In other words, FIG. 3 shows the massage roller in an open condition for receiving a massageable portion of a user's body.

The structure of the cross member 102 and the position in which the first and second handles 104, 106 couple to the cross member 102 allow the user to draw the pair of handles 104, 106 apart from another under outward forcible urging to increase the distance between roller elements 112, 113 and 114, 115. Increasing the distance between roller elements 112, 113 and 114, 115 allows for a massageable portion of user's body to fit between roller elements 112, 113 and 114, 115 for a rolling massage effect. As shown in FIG. 3, the cross member 102 flexes about the middle portion 136.

Figure 4:
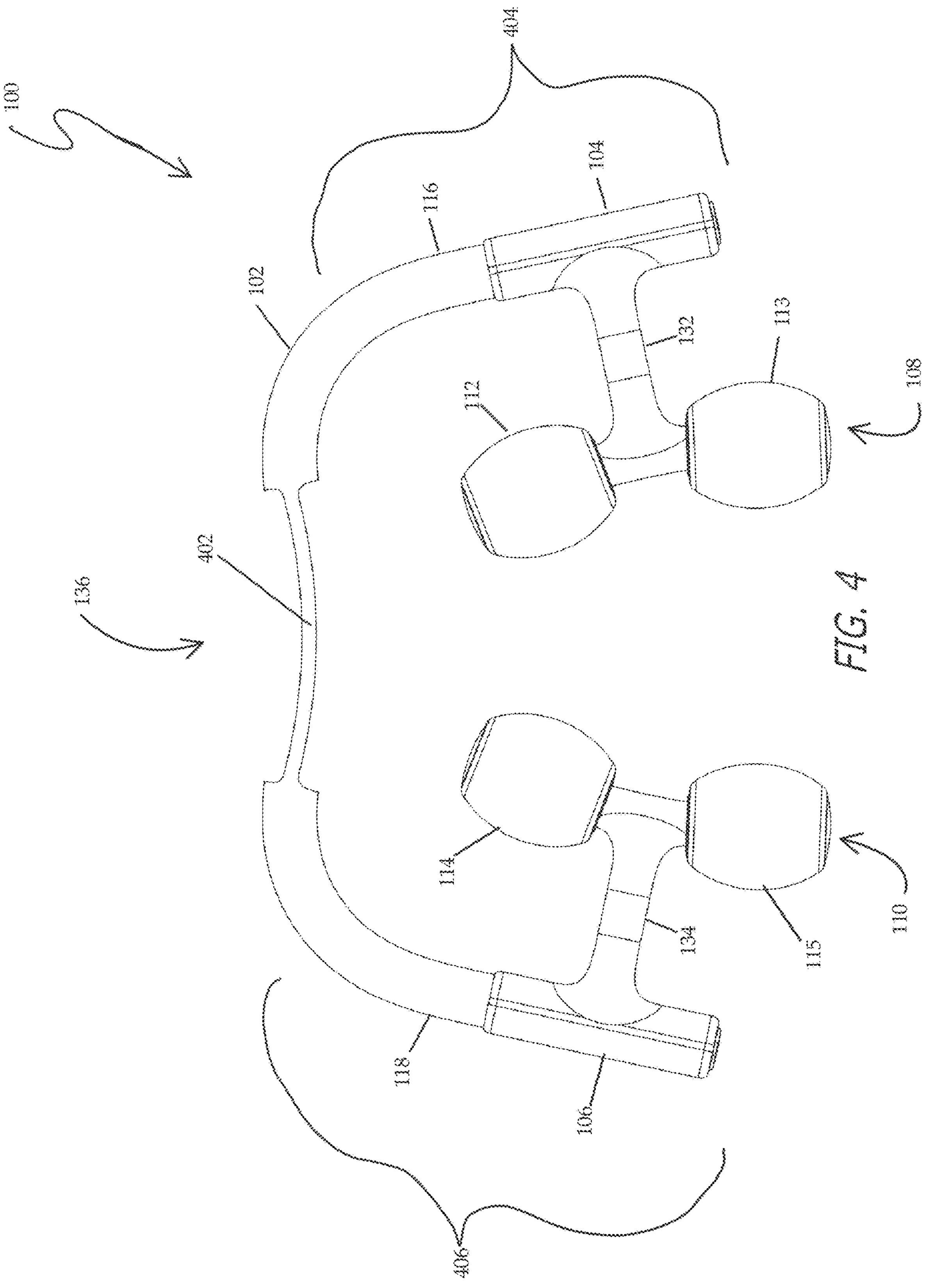
FIG. 4 is a top view of the massage roller of FIG. 3 where the inner core material of cross member is shown.

In this example, the cross member comprises of a material core 402 that may be wrapped in a silicone cover. Such material core 402 is shown in FIG. 4. In particular, the material core 402 provides rigidity at least in the hand-hold locations (404, 406) of the cross member 102 that the user may at least hold to forcibly increase the distance between roller elements 112, 113 and 114, 115. It should further be understood that hand hold locations 404, 406 may also comprise of handles 104, 106. FIG. 4 further shows the material core 402 thinning out in the middle portion 136 of the cross member 102. Such thinning construction in the middle portion 136 provides flexibility such that a user is able to forcibly move the massage roller 100 from a closed condition to an open condition, which ultimately allows for various sizes of parts of massageable portions of a user's body to fit between roller elements 112, 113 and 114, 115.

Figure 5:
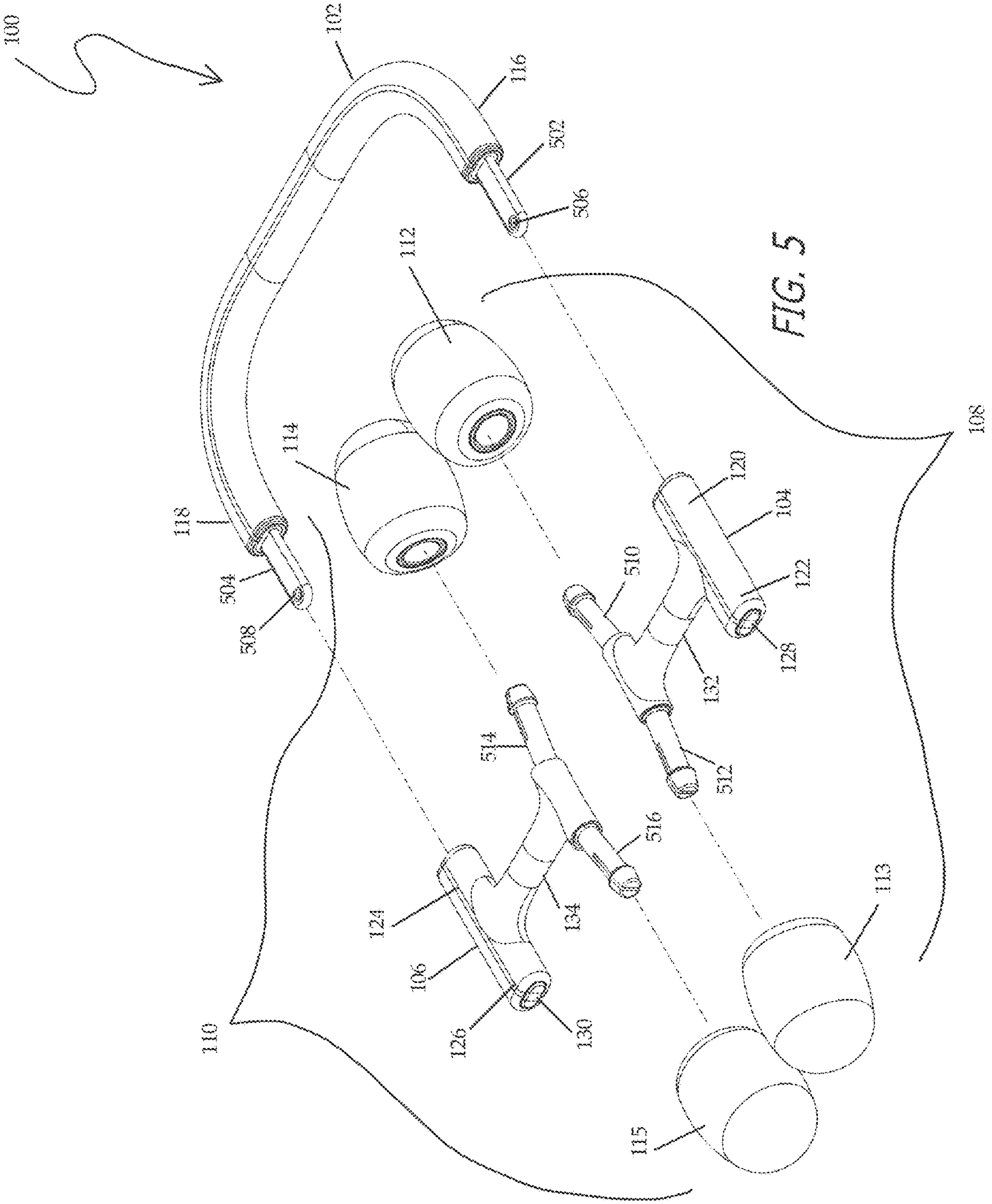
FIG. 5 is an exploded view of the massager roller of FIG. 1.

FIG. 5 is an exploded view of the massage roller 100 of FIG. 1. As mentioned above, massage roller 100 may comprise of first and second massage roller assemblies 108, 110 having a first handle 104 and a second handle 106 and these first and second handles 104, 106 may be detachably coupled to cross member 102. In particular, a first shaft 502 may be positioned on and extend from the first end 116 of cross member 102 and a second shaft 504 may be positioned on and extend from the second end 118 of cross member 102. These shafts 502, 504 may be removably inserted into the first ends 120, 124 of the first and second handles 104, 106, respectively. In other words, each of the first ends 120, 124 of the first and second handles 104, 106 may include a cavity for receiving shafts 502, 504. To assist in securing shafts 502, 504 to the first ends 120, 124, each of the shafts 502, 504 may include at least one indent or opening 506, 508 that removably engages with a spring loaded lever 704 having a latch 702 located inside the first and second handles 104, 106, respectively. Such detachable spring release mechanism 600 is shown in greater detail in FIGS. 6-7A.

Also shown in FIG. 5 are axle rods 510, 512, 514, 516 in which roller elements 112, 113, 114, 115 are freely rotatably coupled. Axle rods 510, 512 are located on support arm 132 and axle rods 514, 516 are located on support arm 134. Axle rods 510, 512 may be positioned such that the rods extend away from each other relative to support arm 132 and axle rods 514, 516 may be positioned such that the rods extend away from each other relative to support arm 134. Such positioning allows the roller elements on each handle (i.e., roller elements 112, 113 on first handle 104 and roller elements 114, 115 on second handle 104) to be sufficiently spaced from one another (i.e., in spaced relationship to one another) in order to provide effective massaging to bigger massageable portions of a user's body. Additionally, the axle rods of each handle 104, 106 may also extend away from each other at an angle greater than 90 degrees relative to the longitudinal axis of support arms 132. 134. For example, axle rods 510, 512, may not extend perpendicular to support arm 132 and axle rods 514, 516 may not extend perpendicular to support arm 134. Rather, axle rods 510, 512, may extend from support arm 132 at an angle slightly greater than 90 degrees from the longitudinal axis of support arm 132, and likewise, axle rods 514, 516 may extend from support arm 134 at an angle slightly greater than 90 degrees from the longitudinal axis of support arm 134. In other words, the longitudinal axis of rotation of the first roller element 112 is not parallel (i.e., misaligned) to the longitudinal axis of rotation of the second roller element 113. Similarly, the longitudinal axis of rotation of the third roller element 114 is not parallel (i.e., misaligned) to the longitudinal axis of rotation of the fourth roller element 115. By having the axle rods of each massage roller assembly extend from the relative support arms at an angle greater than 90 degrees, the space created between roller elements 112, 113 and 114, 115 creates an oval-like shape that is better adapted to effectively massage tubular portions of a user's body such as arms or legs. It should also be understood that while the present example shows two axle rods on each handle 104, 106, in other examples, each handle may comprise of one axle rod or more than two axle rods.

Figure 6:
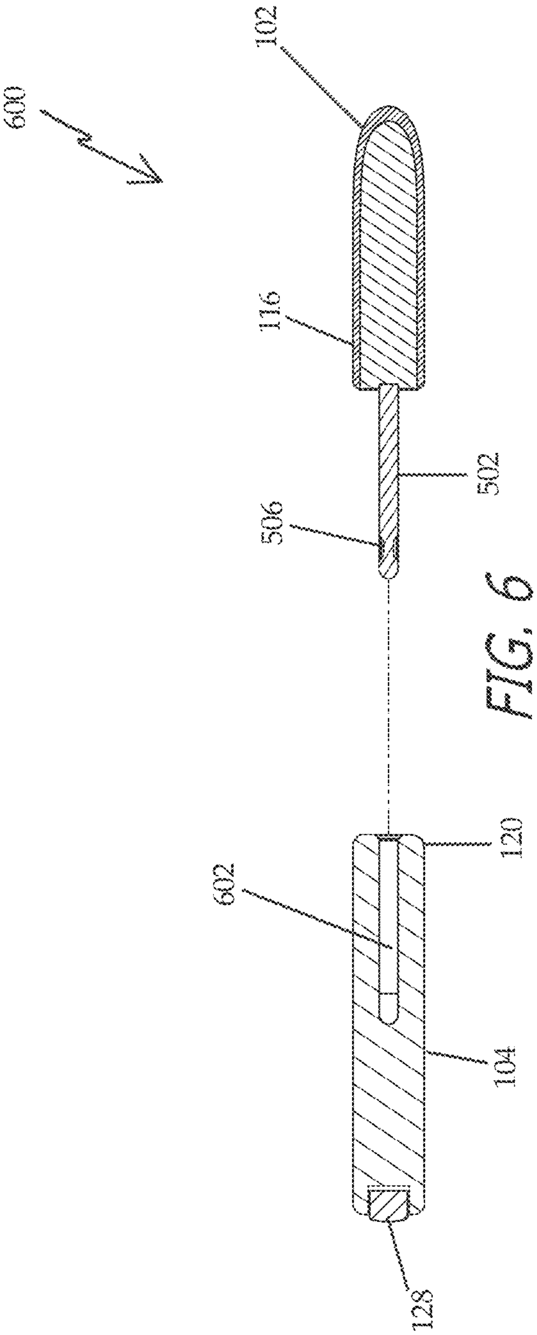
FIG. 6 is a cross section of one example of a detachable mechanism of the present invention where one of the handles is removed from the cross member of FIG. 1.
Figure 7:
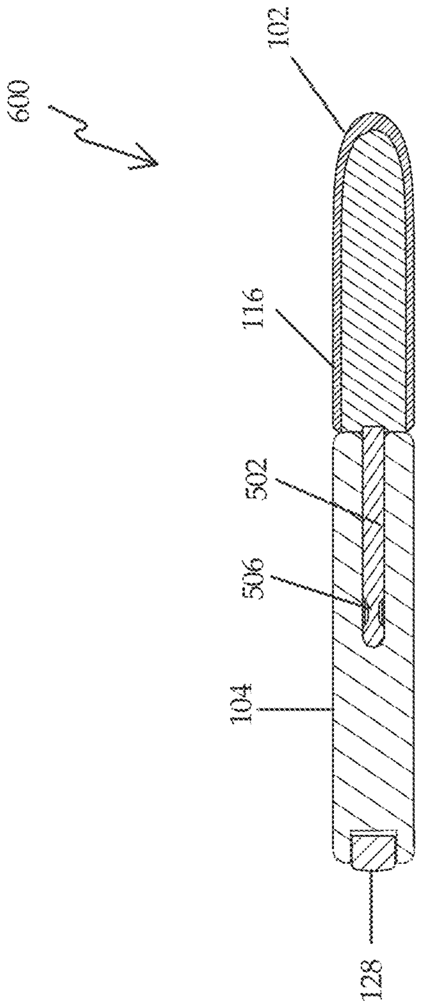
FIG. 7 is a cross section of the detachable mechanism of FIG. 6 where the handle is inserted in the cross member of FIG. 1.

FIG. 6 is a cross section of the handle 104 removed from the cross member 102, while FIG. 7 is a cross section of the cross member 102 inserted into handle 104. The detachable mechanism 600 shown in FIGS. 6 and 7 for detaching and attaching handle 104 to the first end portion 116 of cross member 102 may also be the same for detaching and attaching handle 106 to the second end portion 118 of cross member 102.

In particular, handle 104 may include a cavity 602 having an opening at its first end 120 that receives shaft 502 that extends from the first end portion 116 of cross member 102. To secure shaft 502 to detachable handle 104 (or alternatively, to secure detachable handle 104 to shaft 502), shaft 502 may include at least one indent or opening 506 that engages with a spring loaded lever 704 having a latch 702 located within cavity 602. Such latch 702 may be positioned at the end of lever 704 and may operationally connected to and actuated by release button 128. In other words, the tension of the spring that is located within handle 104 may allow handle 104 to securely attach to cross member 102. To release handle 104 from shaft 502 of cross member 102, release button 128 may be pressed that releases the tension of the spring and moves the latch 702 such that it no longer engages with opening or indent 506, thus ultimately allowing handle 104 to be slidably removed or detached from shaft 502 of cross member 102. It should be noted that while FIGS. 6 and 7 show one example of a detachable mechanism for detaching and attaching handles 104, 106 to cross member 102, other detachable mechanisms known in the art may also be utilized, including but not limited to screws, friction fits, press fits, clips, and/or magnets.

Figure 7A:
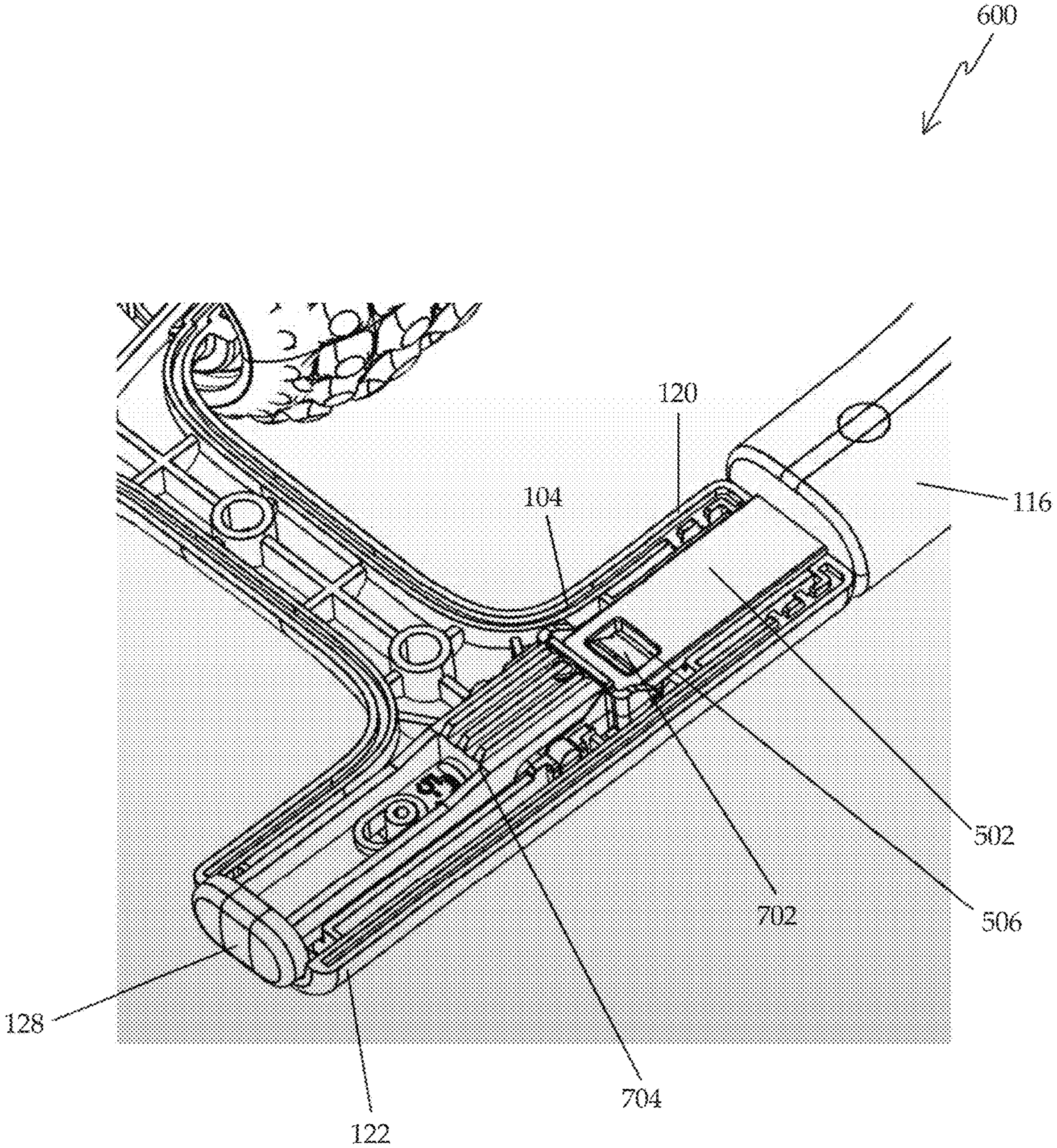
FIG. 7A is an internal top perspective view of the detachable mechanism of FIG. 6 of the present invention.

FIG. 7A is a more detailed internal top perspective view of the detachable mechanism 600 of the present invention. In particular, FIG. 7A shows an internal view of the detachable mechanism 600 within handle 104. It should be understood that handle 106 may include the same detachable mechanism 600, including the same components and functions. As shown, detachable mechanism 600 may include a release button 128 operationally connected to a spring loaded lever 704 having a latch 702 positioned at the end of the lever 704. As shown in FIG. 7A, when handle 104 is attached to shaft 502, the latch 702 gets inserted and spring locked in opening or indent 506. Upon actuating the release button 128 (i.e., pressing the button such that it moves from a first position to a second position along the x-axis or length of the massager roller 100), lever 704 is pushed down such that the latch 702 moves from a first position to a second position along the y-axis or height of the massage roller 100 such that it no longer is spring locked in opening or indent 506. When this occurs, the handle 104 may be detached from cross member 102. As stated above, while FIGS. 6-7A show one example of a detachable mechanism for detaching and massage roller assemblies 108, 110 to cross member 102, other detachable mechanisms known in the art may also be utilized, including but not limited to screws, friction fits, press fits, clips, and/or magnets.

Figure 8:
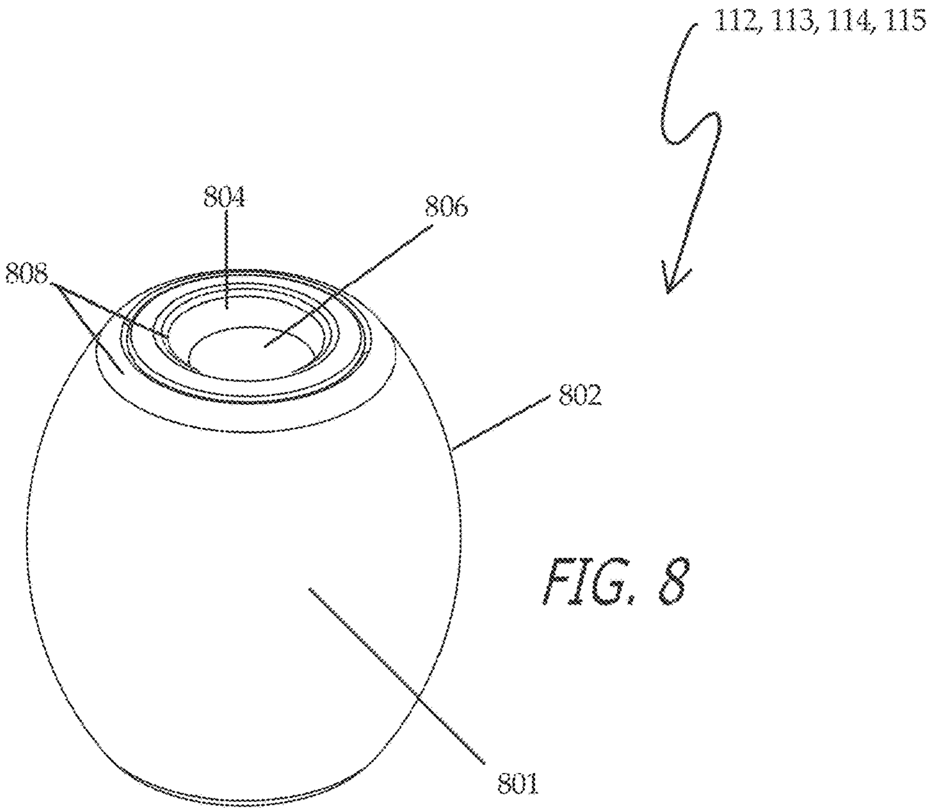
FIG. 8 is a bottom perspective view of one example of the roller element of FIG. 1.

FIG. 8 is a bottom perspective view of one example of a roller element 112, 113, 114, 115 of FIG. 1. In particular, roller element 112, 113, 114, 115 can be in the form of an oval or annular member 801 that defines an outer periphery 802 and a bottom opening 804 that opens to an internal cavity 806 for receiving axle rods 510, 512, 514, 516. Roller element 112, 113, 114, 115 may further include one or more bearing elements 808 that assist to reduce friction in rotation of the roller elements 112, 113, 114, 115 about the corresponding one of axle rods 510, 512, 514, 516. Particular examples of the annular member 801 can be made from a substantially rigid material, including but not limited to metal, ceramic, plastic, wood, or the like, or as to other examples can be made from a resiliently elastic material which to an extent deforms on engagement with the massageable portion of a user's body such as a plasticized resin, a silicone rubber, a fluoropolymer, a natural or synthetic rubber, polyurethane, or the like.

Figure 9:
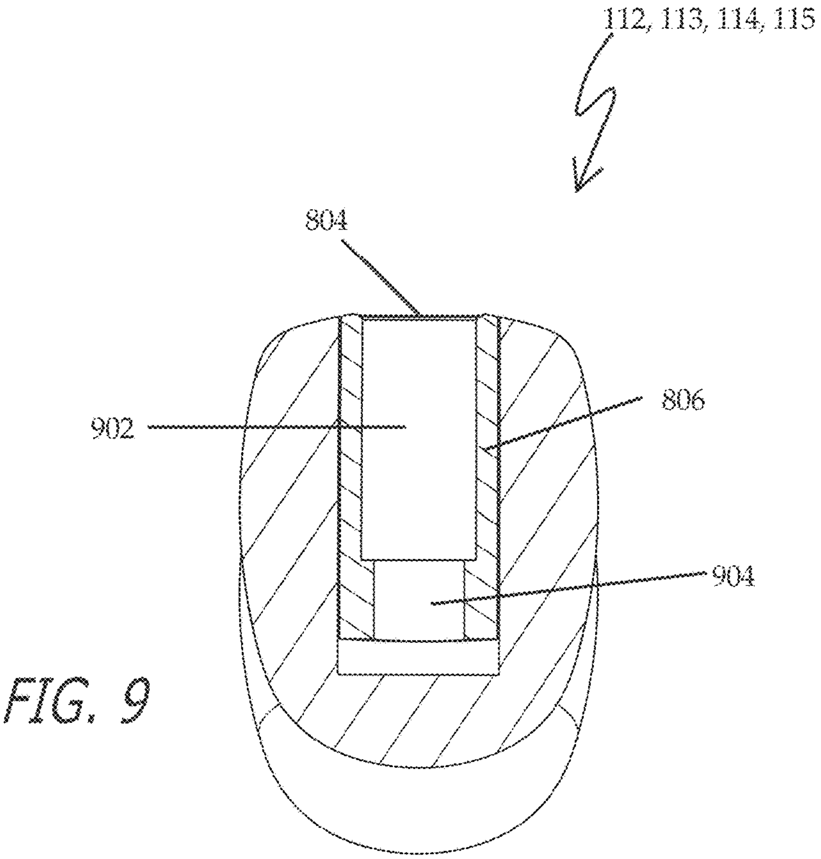
FIG. 9 is a cross section of one example of the roller element of FIG. 1.

FIG. 9 is a cross section of one example of the roller element 112, 113, 114, 115 of FIG. 1. In particular, FIG. 9 shows the internal cavity 806 for receiving the corresponding one of axle rods 510, 512, 514, 516. The cavity 806 may be an elongated cavity that has a wide channel 902 at the opening of the cavity and a narrower channel 904 at the opposing end of the cavity 806. As will be discussed in greater detail in connection with FIG. 10, one of the purposes of the cavity 806 having a wide channel 902 at the opening is to more easily allow the insertion of the corresponding one of axle rods 510, 512, 514, 516 into the cavity 806. Further, one of the purposes of the cavity 806 having a more narrow channel 904 at the opposing end of the cavity 806 is to allow roller element 112, 113, 114, 115 to be frictionally fitted and secured to corresponding one of axle rods 510, 512, 514, 516 while at the same time being capable of being freely rotated on axle rods and easily interchanged with different styles of roller elements as shown in FIGS. 11A and 11B.

Figure 10:
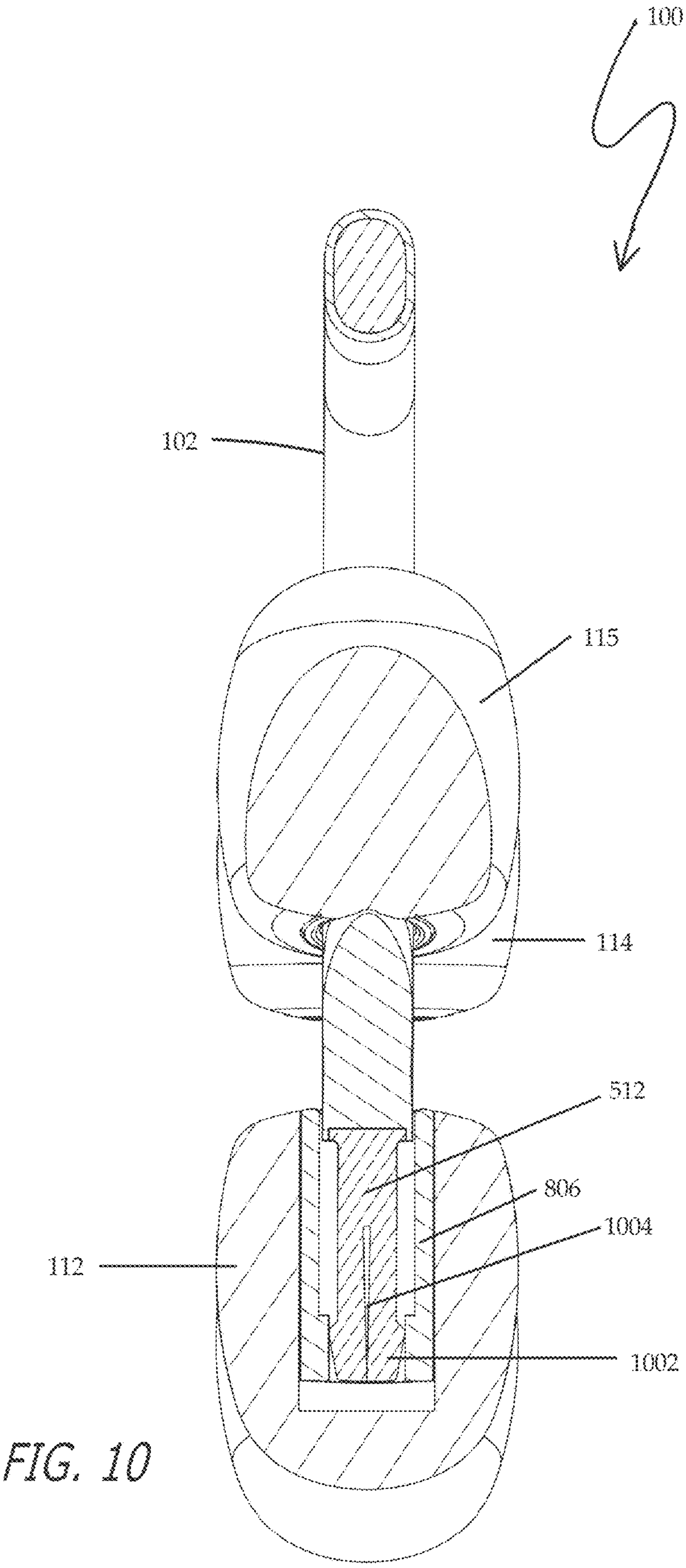
FIG. 10 is a cross section of the roller element of FIG. 1 connected to one of the handles of FIG. 1.

FIG. 10 is a cross section of a roller element of FIG. 1 when rotatably coupled or attached to the roller assembly 102 of FIG. 1. In particular, FIG. 10 shows that the free end or tip 1002 of axle rod 512 that has a wide circumference such that it can be more frictionally secured within the narrower channel 904 of the cavity 806. Additionally, axle rod 512 may include a slit 1004 that extends from the free end 1002 of axle rod 512. The purpose of such slit 1004 is to allow the cavity 806 of roller element 112 to squeeze or compress axle rod 512 so that roller element 112 can be more frictionally secured to roller arm 512 while still be able to freely rotate on axle rod 512. It should further be understood that these structures of roller element 112 and axle rod 512 may be the same for any or all roller elements 112, 113, 114, 115 and axle rods 510, 512, 514, 516 of the present invention.

Figure 11A:
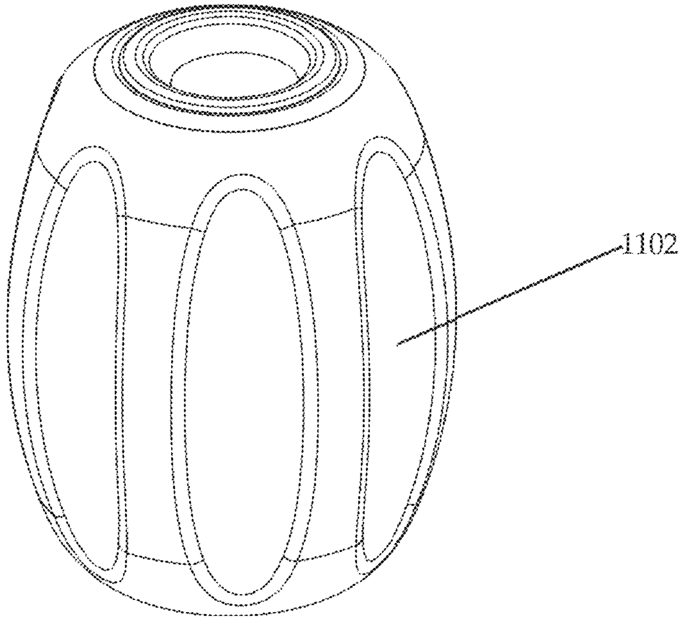
FIGS. 11A and 11B are bottom perspective views of different examples of the roller elements that can be interchanged on the massage roller of FIG. 1.
Figure 11B:
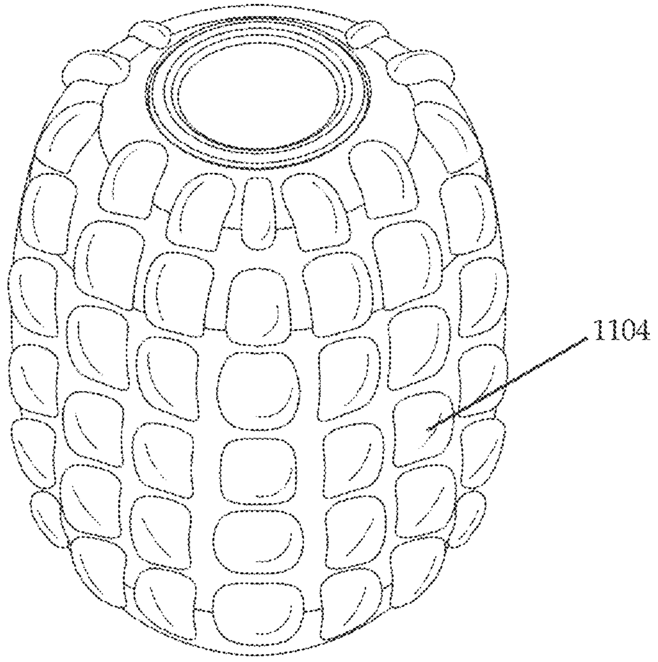

FIGS. 11A and 11B are bottom perspective views of different examples of the roller elements of FIG. 1 that can be interchanged with roller elements 112, 113, 114, 115. For example, while the one or more roller elements 112, 113, 114, 115 can define a generally smooth outer periphery (as shown in the example of FIG. 8), the present invention is not so limited and each of the roller elements 112, 113, 114, 115 can define an outer periphery useful in massaging a massageable portion of the user's body. As shown in FIG. 11A, the outer periphery of the roller element can define an outer periphery having one or more indentations 1102 of any size or shape or as shown in FIG. 11B, the outer periphery of the roller element can define an outer periphery having one or more bumps 1104 of any size or shape. Additionally, the roller elements of the present invention may have a circular outer periphery, an oval outer periphery, a hexagonal outer periphery, a septagonal outer periphery, an octagonal outer periphery, or the like, which can be used in various permutations and combinations.

Figure 12:
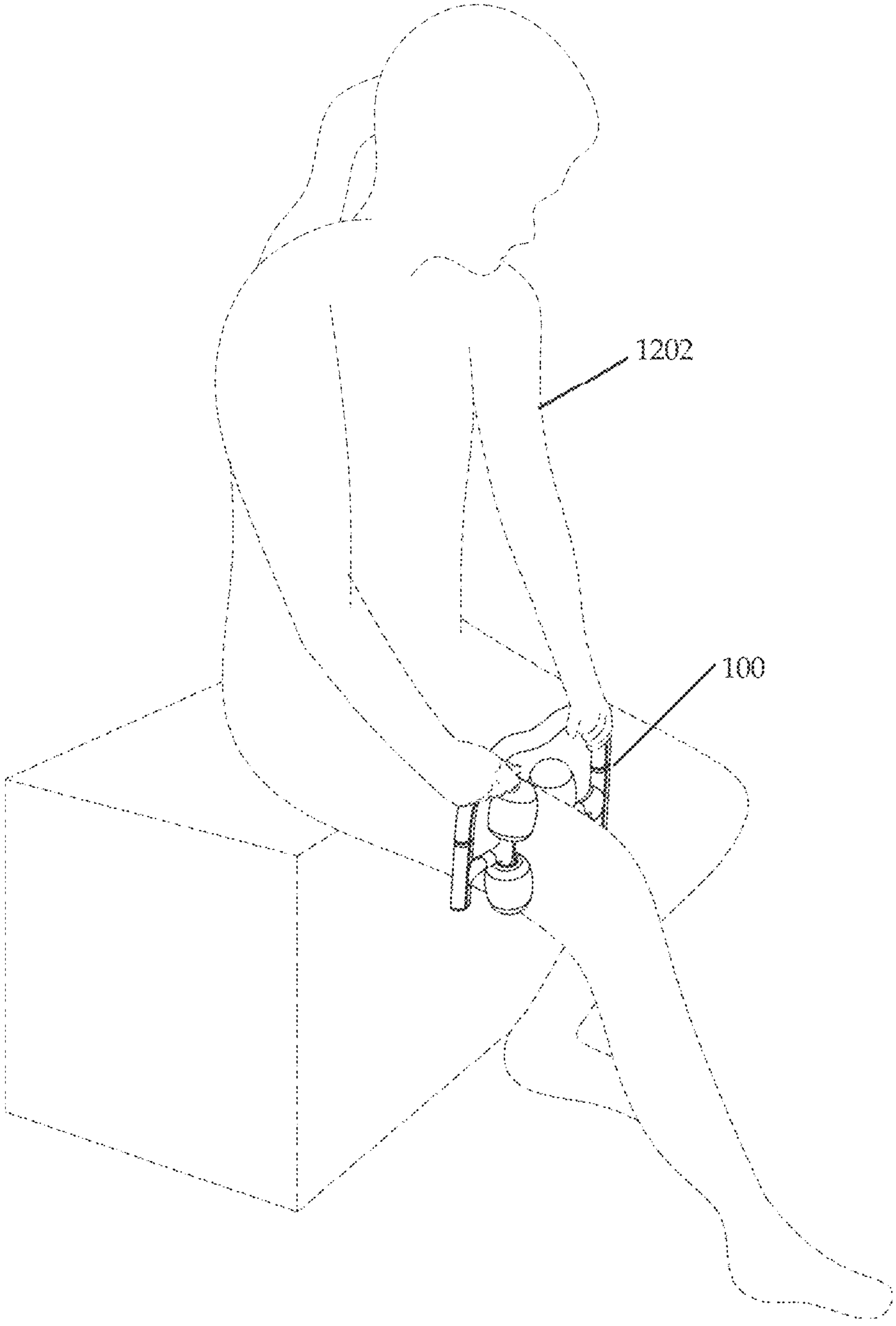
FIG. 12 is a perspective view of a user operating the massage roller of FIG. 1.

FIG. 12 is a perspective view of a user 1202 operating the massage roller 100 of FIG. 1. As shown, a user may, for example, massage his or her leg by flexing apart the massage roller 100 in order to position the leg in between roller elements 112, 113 and 114, 115 for a rolling massage effect. In particular, a user may travel the massage roller 100 back and forth on the massageable portion to create a self-administered rolling massage effect. It should also be understood that while the illustrative example of FIG. 12 shows the massageable portion of the body as the upper portion of a leg of a person, the invention is not so limited, and the massageable portion of the body can be any portion of the body which can be massaged by travel of the massage roller on the massageable portion such as the lower leg, upper arm, lower arm, upper body, lower body, buttocks, hands, feet, or the like. Moreover, while the example of FIG. 12 shows the user of the massage roller 100 massaging the user's own massageable portion of the body, the invention is not so limited, and the user of the massage roller can be separate or independent or discrete from the massageable portion of the body.

Figure 13:
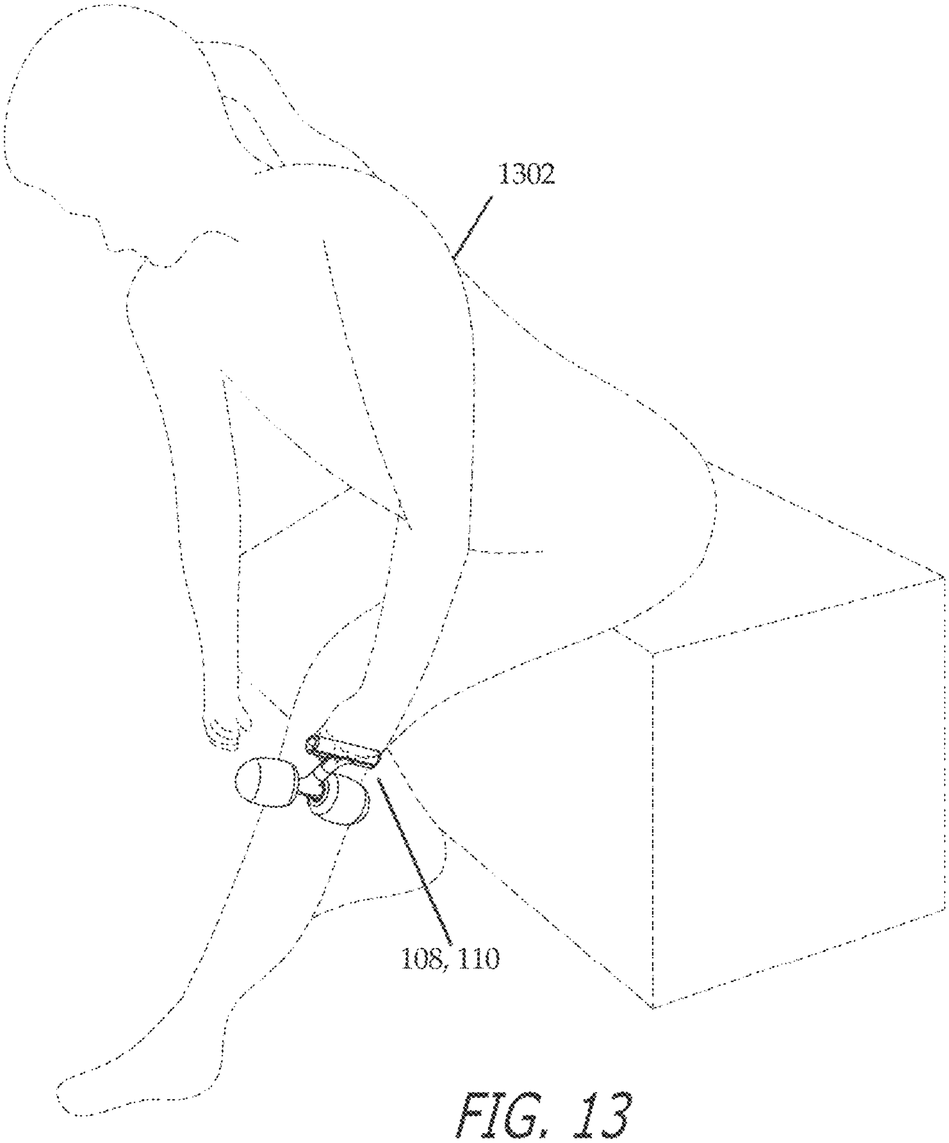
FIG. 13 is a perspective view of a user operating a massage roller assembly of FIG. 1.

FIG. 13 is a perspective view of a user 1302 operating one of the massage roller assemblies 108, 110 detached from cross member 102. As stated above, when detached, each of the massage roller assemblies 108, 110 disclosed herein can also be used as an independent massage device. Therefore, it should be understood that each of the massage roller assemblies 108, 110 may be described also as a "massage roller," or "mini massage roller."

As shown in FIG. 13, a user may, for example, massage his or her leg by detaching one of the handles 104, 106 from the cross member 102 and use the massage roller assembly 108 or 110 to massage the massageable portion of the body. Unlike the massage roller 100, such massage roller assemblies 108, 110, when detached, can allow a user to reach massageable portions of the body that may not be as easy to reach with the massage roller 100. Similarly, it should also be understood that while the illustrative example of FIG. 13 shows the massageable portion of the body as the lower portion of a leg of a person, the invention is not so limited, and the massageable portion of the body can be any portion of the body which can be massaged by travel of the massage roller assemblies 108, 110 on the massageable portion.

It should be further understood that all component parts disclosed herein, which are detachably coupled to one another, may also be fixed to one another. For example, massage roller assemblies 108, 110 may be fixed to the cross member 102 and roller elements 112, 113, 114, 115 may be fixed to axle rods 510, 512, 514, 516. It should further be understood that the location of the coupling or detachable coupling between any of the component parts disclosed herein is not limited. For example, the massage roller assemblies 108, 110 may detachably couple to the cross member 102 at any location on the cross member 102 without departing from the scope of the invention.

The foregoing description of implementations has been presented for purposes of illustration and description. It is not exhaustive and does not limit the claimed inventions to the precise form disclosed. Modifications and variations are possible in light of the above description or may be acquired from practicing the invention. The foregoing description is for the purpose of illustration only, and not for the purpose of limitation. The claims and their equivalents define the scope of the invention.

The invention claimed is:

1. A massage roller for massaging a massageable portion of a user's body, the massage roller comprising:

a cross member having a first end and a second end; and a first massage roller assembly detachably coupled to the first end of the cross member, the first massage roller assembly comprising a first handle, a first support arm extending from the first handle and supporting at least one first roller element; and a second massage roller assembly is-detachably coupled to the second end of the cross member, the second massage roller assembly comprising a second handle, a second support arm extending from the second handle towards the first support arm and supporting at least one second roller element, where the cross member is configured to permit movement of the first and second massage roller assemblies away from one another in response to the first and second handles being grasped and drawn apart by the user, thereby increasing a distance between the at least one first roller element and the at least one second roller element to receive the massageable portion of the user's body therebetween, and where the first and second handles are each configured to be grasped by the user to operate the first and second massage roller assemblies, respectively, as independent massage devices when the first and second massage roller assemblies are detached from the cross member.

2. The massage roller of claim 1, where the cross member flexes in response to the first and second handles being grasped and drawn apart by the user.

3. The massage roller of claim 1, where the first massage roller assembly further comprises at least a third roller element and the second massage roller assembly further comprises at least a fourth roller element.

4. The massage roller of claim 3, where the first and third roller elements are in spaced relationship to one another and where the second and fourth roller elements are in spaced relationship to one another.

5. The massage roller of claim 4, where the first massage roller assembly comprises a first axle rod and a second axle rod that extends away from the first axle rod, where the first roller element is rotatably coupled to the first axle rod and the third roller element is rotatably coupled to the second axle rod.

6. The massage roller of claim 5, where the second massage roller assembly comprises a third axle rod and a fourth axle rod that extends away from the third axle rod, where the second roller element is rotatably coupled to the third axle rod and the fourth roller element is rotatably coupled to the fourth axle rod.

7. The massage roller of claim 4, where the longitudinal axis of rotation of the first and third roller elements are misaligned from one another and where the longitudinal axis of rotation of the second and fourth roller elements are misaligned from one another.

8. The massage roller of claim 1, where the position of the at least one first roller element of the first massage roller assembly mirrors the position of the at least one second roller element of the second massage roller assembly along a plane that extends along a height of the massage roller and directly between the at least one first roller element of the first massage roller assembly and the at least one second roller element of the second massage roller assembly.

9. The massage roller of claim 1, where the first massage roller assembly detaches from the first end of the cross member by actuating a first release button, and where the second massage roller assembly detaches from the second end of the cross member by actuating a second release button.

10. The massage roller of claim 1, where the first massage roller assembly includes a cavity for receiving the first end of the cross member and where the second massage roller assembly includes a cavity for receiving the second end of the cross member.

11. A massage roller for massaging a massageable portion of a user's body, the massage roller comprising:

a cross member having a first end, a middle portion, and a second end, where the middle portion of the cross member is flexible so the first end and second end are configured to be drawn apart;

a first massage roller assembly detachably positioned at the first end of the cross member, the first massage roller assembly comprising a first handle, a first support arm extending from the first handle, a first axle rod and a second axle rod extending in opposite directions from the first support arm, a first roller element rotatably coupled to the first axle rod, and a second roller element rotatably coupled to the second axle rod; and a second massage roller assembly detachably positioned at the second end of the cross member, the second massage roller assembly comprising a second handle, a second support arm extending from the second handle towards the first support arm, a third axle rod and a fourth axle rod extending in opposite directions from the second support arm, a third roller element rotatably coupled to the third axle rod, and a fourth roller element rotatably coupled to the fourth axle rod, and where the first and second massage roller assemblies are spaced apart such that the massageable portion of a user's body is configured to be positioned between the first and second massage roller assemblies; and where the first and second handles are each configured to be grasped by the user to operate the first and second massage roller assemblies, respectively, as independent massage devices when the first and second massage roller assemblies are detached from the cross member.

12. The massage roller of claim 11, where the cross member comprises a core material that thins out in the middle portion to provide flexibility.

13. The massage roller of claim 11, where the first and second handles each have a first end and a second free end, where the first support arm extends from the first handle at a position between the first end and the second free end of the first handle, and where the second support arm extends from the second handle at a position between the first end and the second free end of the second handle.

14. The massage roller of claim 11, where the first support arm extends transverse to the first handle, and where the second support arm extends transverse to the second handle.

15. The massage roller of claim 11, where the first axle rod and the second axle rod extend from the first support arm at an angle greater than 90 degrees from a longitudinal axis of the first support arm, and where the third axle rod and the fourth axle rod extend from the second support arm at an angle greater than 90 degrees from a longitudinal axis of the second support arm.

16. The massage roller of claim 11, where each of the first, second, third, and fourth roller elements is removably coupled to its respective axle rod and is interchangeable with a replacement roller element.

* * * * *